United States Patent
Van Vlierberghe et al.

(10) Patent No.: US 12,123,780 B2
(45) Date of Patent: Oct. 22, 2024

(54) IMMERSION DEVICE FOR TEMPERATURE MEASUREMENT AND METHOD FOR POSITION DETECTION

(71) Applicant: Heraeus Electro-Nite International N.V., Houthalen (BE)

(72) Inventors: Michel Van Vlierberghe, Houthalen (BE); Guido Neyens, Houthalen (BE)

(73) Assignee: Heraeus Electro-Nite International N.V., Houthalen (BE)

( * ) Notice: Subject to any disclaimer, the term of this patent is extended or adjusted under 35 U.S.C. 154(b) by 519 days.

(21) Appl. No.: 17/649,152

(22) Filed: Jan. 27, 2022

(65) Prior Publication Data

US 2022/0244107 A1    Aug. 4, 2022

(30) Foreign Application Priority Data

Feb. 1, 2021   (EP) ..................................... 21154561

(51) Int. Cl.
| | |
|---|---|
| *G01J 5/10* | (2006.01) |
| *F27B 3/22* | (2006.01) |
| *F27B 3/28* | (2006.01) |
| *G01D 5/20* | (2006.01) |
| *G01J 5/00* | (2022.01) |

(52) U.S. Cl.
CPC .................. *G01J 5/10* (2013.01); *F27B 3/22* (2013.01); *F27B 3/28* (2013.01); *G01D 5/20* (2013.01); *G01J 5/004* (2013.01)

(58) Field of Classification Search
CPC .... G01J 5/10; G01J 5/004; G01D 5/20; F27B 3/22; F27B 3/28
See application file for complete search history.

(56) References Cited

U.S. PATENT DOCUMENTS

| | | | |
|---|---|---|---|
| 2,886,617 A | 5/1959 | Sorg et al. | |
| 4,128,414 A * | 12/1978 | Hater | B22D 11/108 75/568 |
| 6,190,038 B1 * | 2/2001 | Kita | G01K 1/105 374/E1.017 |
| 7,046,362 B2 | 5/2006 | Lehmann et al. | |

(Continued)

FOREIGN PATENT DOCUMENTS

| | | |
|---|---|---|
| EP | 2940441 B1 | 11/2015 |
| EP | 3051264 B1 | 11/2017 |

(Continued)

*Primary Examiner* — Octavia Hollington
(74) *Attorney, Agent, or Firm* — Blank Rome LLP

(57) ABSTRACT

The invention relates to an immersion device and a method for detecting a position of an optical cored wire using an immersion device. An immersion device for measuring a temperature of a metal melt inside an electric arc furnace vessel with an optical cored wire comprises a blowing lance for blowing purge gas into an entry point to the vessel and a detecting means for detecting a position of the optical cored wire. The optical cored wire can be moved in a feeding channel and/or in the blowing lance relative to the entry point. The detecting means is configured to detect the presence of the optical cored wire in or close to the blowing lance. This enables short distances between the leading end of the fiber and the melt and, thus, short time intervals between temperature measurement sequences.

15 Claims, 3 Drawing Sheets

(56) References Cited

U.S. PATENT DOCUMENTS

| | | | |
|---|---|---|---|
| 7,748,896 B2 * | 7/2010 | Dams | G01J 5/046 374/208 |
| 7,906,747 B2 * | 3/2011 | Poulalion | C21C 7/0056 219/146.1 |
| 8,282,704 B2 * | 10/2012 | Poulalion | B21F 1/02 75/414 |
| 10,514,302 B2 * | 12/2019 | Kendall | G01J 5/042 |
| 11,440,081 B2 | 9/2022 | Kendall et al. | |
| 2003/0002560 A1 | 1/2003 | Yamanaka et al. | |
| 2004/0240518 A1 | 12/2004 | Memoli et al. | |
| 2015/0323258 A1 | 11/2015 | Neyens et al. | |
| 2016/0216161 A1 | 7/2016 | Neyens et al. | |
| 2016/0216162 A1 | 7/2016 | Neyens et al. | |
| 2019/0201968 A1 * | 7/2019 | Kendall | G01J 5/004 |

FOREIGN PATENT DOCUMENTS

| | | | |
|---|---|---|---|
| EP | 3339823 A1 | | 6/2018 |
| EP | 3051262 B1 | | 7/2018 |
| EP | 2799824 B1 | | 10/2019 |
| JP | H07151608 A | | 6/1995 |
| JP | H09243459 A | | 9/1997 |
| JP | H09304185 A | | 11/1997 |
| JP | H10185698 A | | 7/1998 |
| JP | H11118607 A | | 4/1999 |
| JP | 2003013131 A | | 1/2003 |
| KR | 20230098286 A | * | 7/2023 |

* cited by examiner

IMMERSION DEVICE FOR TEMPERATURE MEASUREMENT AND METHOD FOR POSITION DETECTION

CROSS-REFERENCE TO RELATED APPLICATIONS

This application claims priority pursuant to 35 U.S.C. 119(a) to European Patent Application No. 21154561.1, filed Feb. 1, 2021, which application is incorporated herein by reference in its entirety.

FIELD OF THE INVENTION

The invention relates to an immersion device for measuring a temperature of a metal melt inside an electric arc furnace (EAF) vessel using an optical cored wire and a method for detecting a position of an optical cored wire using an immersion device.

BACKGROUND

Metallurgical processes can be performed in an arc furnace as disclosed in US 2886617 A, in particular in an EAF. To improve process control, the temperature of a metal melt has to be measured. This can e.g. be performed by means of an optical fiber which is immersed into the melt and a corresponding detector connected to the fiber, as described in EP 2 799 824 A1, EP 3 051 264 A1 and EP 2 799 824 A1. The optical fiber itself is coated with metal. In the mentioned processes, the optical fiber is introduced into a disposable guiding tube before the measurement. At least a part of the guiding tube melts during use. To determine the quality of the temperature measurement, the position of the optical fiber with the guiding tube inside a feeding means can be monitored. JPH09304185 A discloses a metallic sheath optic fiber for measuring the temperature of molten steel, wherein a sent length of the optic fiber is measured by a motor with an encoder. A similar device is known from JPH07151608 A.

In another process, the optical fiber may be provided as a virtually endless tube which is wound on a coil and unwound for conducting a measurement. A feeding device for such an optical fiber is described in EP 3 051 262 A1. EP 2 940 441 A1 describes a device for temperature measurement with a gap between the optical fiber and a guiding tube. An alternative approach is described in JPH09243459 A, wherein the fiber is cut to define a known leading end position.

It is the task of the present invention to improve the temperature measurement in a vessel of an electric arc furnace.

SUMMARY

The task of the invention is solved by an immersion device according to claim 1 and a method for detecting a position of an optical cored wire according to the additional claim. Advantageous embodiments are defined in the dependent claims.

The task is solved by an immersion device for measuring a temperature of a metal melt inside an electric arc furnace vessel with an optical cored wire. The immersion device comprises a blowing lance for blowing purge gas into an entry point to the vessel and a detecting means for detecting a position of the optical cored wire. The immersion device is configured such that the optical cored wire can be moved in a feeding channel and/or in the blowing lance relative to the entry point. The detecting means is configured to detect the presence of the optical cored wire in or close to the blowing lance.

As the leading end of the optical cored wire melts during temperature measurement, its position has to be determined before each temperature measurement. In conventional solutions, the position of the optical cored wire is detected in the feeding tube and, thus, at a position that is comparably far away from the vessel. Therefore, the optical cored wire has to be moved a long way back and forth between temperature measurement and position measurement which is time-consuming. Thus, using conventional techniques, the interval between two temperature measurements is long.

Detecting the presence of the optical cored wire in or close to the blowing lance leads to faster transport of the optical cored wire and, thus, enables a shorter time interval between measurements. This is of particular importance as the temperature of the liquid steel bath during EAF operation can change at rates of up to 70° C. per minute. More measurements can be performed, thus enabling a better process control. The distance of the leading end to the melt can be kept significantly lower. In addition, debris or wear caused by the returning hot optical cored wire can always pollute and damage or block the tubing. By reducing the movement path of the optical cored wire inside the feeding channel, this risk can be minimized. As according to the invention, the movement of the leading end of the optical cored wire can be limited to the blowing lance which can easily be replaced, a simple solution is enabled in case of pollution or damage. The part of the detecting means which gets close to the hot optical cored wire can be easily replaced. In addition, the temperature measurement becomes more reliable because the leading end can be immersed on the best landing point.

A blowing lance is a lance through which purge gas can be blown into the vessel. This can help prevent penetration of metal, slag and/or debris into the feeding channel. The blowing lance may be replaceable. Typically, the blowing lance is straight, i.e. not curved, for feeding the optical cored wire along a straight path towards the melt. The blowing lance may be manufactured in one piece. The blowing lance is in particular arranged coaxial to the feeding channel and/or axially adjacent to the feeding channel. In particular, the feeding channel adjoins the blowing lance in the direction away from the vessel. A part of the detecting means for detecting the presence of the optical cored wire may be arranged on the blowing lance. A part of the detecting means may be arranged close the blowing lance, e.g. on the feeding channel, near a connection of the blowing lance and the feeding channel and/or between blowing lance and feeding channel.

The blowing lance may serve for guiding the optical cored wire into the melt and/or out of the melt inside the vessel. The purge gas cools the blowing lance and/or the optical cored wire therein. During a measuring sequence, the optical cored wire can be moved inside the feeding channel and the blowing lance towards the melt.

The feeding channel serves for feeding the optical cored wire into the vessel and/or out of the vessel. The feeding channel defines a straight and/or curved path along which the optical cored wire can be moved. In particular, the moving means is configured for moving the optical cored wire along the path defined by the feeding channel. The feeding channel is in particular closed and/or has a circular cross-section. It may comprise a feeding tube, e.g. a metal tube, i.e. a tube through which the optical cored fiber can be fed. The feeding channel may be formed by metal walls. It may have an inner diameter above 7 mm, in particular above 9 mm, and/or below 15 mm, in particular below 12 mm. The device may comprise the feeding channel. The feeding channel and the blowing lance can together be referred to as feeding system. The feeding system may further comprise the detecting means or the detector.

The optical cored wire comprises an optical fiber which may be e.g. a glass fiber. The optical fiber may be a graded index fiber with a diameter of 50 µm or 62.5 µm. In particular, the optical cored wire comprises a metal tube arranged around the fiber, i.e. it is a metal coated optical fiber, also referred to as FiMT (Fiber in a Metal Tube). The metal tube may have an outer diameter of more than 1 mm, in particular 1.3 mm and/or less than 3 mm, in particular 2.5 mm. The wall thickness of the metal tube may be more than 0.1 mm and/or less than 0.3 mm, in particular less than 0.2 mm. The optical cored wire may further comprise an outer tube arranged around the metal tube. The outer tube may be made of metal. It may have an outer diameter of more than 4 mm and/or less than 8 mm, in particular approx. 6 mm. The wall thickness of the outer tube may be more than 0.2 mm, in particular more than 0.3 mm, and/or less than 0.7 mm, in particular less than 0.5 mm.

The leading end of the optical cored wire is the end which is immersed into the melt in order to measure the temperature. The position of the leading end of the optical cored wire typically corresponds to the position of the leading end of the optical fiber. In particular, the optical cored wire is consumed in the direction from the leading end towards the other, opposite end. After each measuring sequence, another part of the optical cored wire will be the leading end. The other end may be connected with a detecting unit to evaluate signals measured and/or transported by the optical cored wire to determine the temperature. The other end will not be consumed during a measurement. The detecting unit may be configured to receive a light signal, in particular in the IR wavelength range, transmitted by the optical fiber. The detecting unit may be a pyrometer.

Detecting a presence of the optical cored wire means detecting an information relating to whether or not the optical cored wire is present at a certain position. This helps detect the position of the optical cored wire. In particular, the presence of the optical cored wire at a defined position of the blowing lance and/or the feeding channel can be detected. This can be realized in that a part of the detecting means is positioned in a known fixed position relative to the feeding channel and/or blowing lance. In particular, the detecting means is configured to detect the presence of the optical cored wire in a position which has a distance less than 4 m, in particular less than 2 m and in one embodiment less than 1 m of an outer wall of the EAF vessel. In particular, the detection position is above the outer wall. Preferably, the detecting means is configured to detect the presence of the optical cored wire in a position which has a distance less than 1 m, in particular less than 50 cm and in one embodiment less than 20 cm of the blowing lance. The detection position may be above the blowing lance. The distance to the blowing lance is in particular an axial distance.

The immersion device is in particular installed in a stationary manner. In particular, the immersion device is configured such that it can be positioned on an outer wall of the vessel or on a platform on a side of the vessel, if present. If positioned on an outer wall, the immersion device may be installed on an eccentric bottom tap (EBT) platform or at a side wall of the vessel. The optical cored wire may thus be moved downwards into the vessel from the stationary point.

The platform may be a part of the side wall and/or essentially horizontally aligned. In particular, the entry point of the vessel is positioned on the platform and/or is an essentially vertically aligned opening.

In one configuration, the detecting means comprises an inductive sensor for detecting the presence of the optical cored wire. The inductive sensor may be arranged on or close to the blowing lance. For example, it may be arranged on the feeding channel and/or a feeding tube. Two inductive sensors may be used to determine the position of the leading end therebetween.

In one embodiment, the detecting means comprises a detector for measuring a property of a gas flow. In particular, the detector is configured for measuring a flow rate of the gas flow, a flow velocity of the gas flow and/or a gas pressure in the gas flow. Thus, a gas flow is used to detect the presence of the optical cored wire. In particular, a gas flow is realized in or close to the blowing lance such that the presence of the optical cored wire influences the gas flow, e.g. by obstructing at least a part of the flow path of the gas flow. By measurement of the property, the presence of the optical cored wire can be detected. The device may comprise a suitable gas source. The detector may be positioned close to the blowing lance or at a remote position, being connected with a gas line. Typically, gas lines are highly temperature-resistant.

The term gas in the context of the invention refers to any gaseous material, e.g. a gas, a gas mixture and/or a dispersion having gas as continuous medium. Thus, a gas flow may be a flow of mixture of gases such as air.

This embodiment enables a durable and highly temperature resistant position detection. During use as intended, the position in or close to the blowing lance is subjected to adverse conditions, including high temperatures of several hundred degrees Celsius, flames and sparks due to the proximity of the EAF vessel. This embodiment dispenses with electric or electronic components in the heat zone and is thus particularly robust. The technical effort is low as no shielding or heat protection is necessary. It should further be noted that the leading end of the optical cored wire of which the position is to be detected has been in the liquid metal a second before the detection. It has shown that gas flow properties are robust and accurately detect the presence of the optical cored wire in the hot state. In addition, a particularly fast detection of leading end is enabled.

In one embodiment, the immersion device comprises a moving means for moving the optical cored wire in the feeding channel and/or in the blowing lance relative to the entry point. The moving means moves the optical cored wire relative to the feeding channel and/or the blowing lance and along the longitudinal extension of the feeding channel or the blowing lance. The moving means is in particular configured to move the optical cored wire such that the leading end is moved into the vessel and out of the vessel and/or into a melt contained in the vessel and out of the melt. The moving means may thus be configured for a forward movement and/or a backward movement of the optical cored wire. The movement of the optical cored wire is in particular a movement along a straight or curved path. The moving means may comprise a motor.

In a further embodiment, the moving means is configured for feeding the optical cored wire from a coil and/or for winding unused optical cored wire back on the coil.

It has been shown that the position measurement close to the vessel functions particularly well using coiled optical cored wire. Also, the used wire types can reliably be monitored by gas flow detection. This embodiment enables a reliable and low-effort way of providing a great (virtually infinite) length of optical cored wire for a great number of measurements. Thus, the high frequency of temperature measurements can be performed over at least one whole EAF operation cycle, thus enabling a maximum process control.

In a further embodiment, the feeding channel and/or the blowing lance has a first opening and/or a second opening. A gas supply means can be connected with the first opening for introducing pressurized gas into the first opening. The detector may be connected with the second opening by means of a detector line.

In particular, the first opening and/or the second opening is a radial opening with respect to the longitudinal extension of the feeding channel and/or the blowing lance. In particular, the two openings are located on the same axial position with respect to the longitudinal extension of the feeding channel or blowing lance. A gas flow realized through the openings is influenced by the optical cored wire and the detecting means can detect a property of the gas flow in order to detect influence and, thus, the presence or absence of the optical cored wire. Using the openings, it can be detected whether or not the optical cored wire is present between the openings. Thus, an information is derivable whether the leading end of the optical cored wire is on the vessel side or the opposite side of the openings.

The term "connect" or "connection" relates to flow connections in order to enable the respective gas flows. The detector line is a fluid connection between the detector and the second opening. As a rule, a line in the sense of the invention means a fluid connection independent of the type which may e.g. be a pipe, a tube or the like.

This embodiment has shown reliable results even in case that the radial position of the optical cored wire in the feeding channel or blowing lance is not known due to a radial gap between an outer diameter of the optical cored wire and the respective inner wall. When the leading end passes the position between the openings, a jump in the property, e.g. flow or pressure, can be observed. Further, this embodiment enables a particularly reliable and disturbance-free operation.

In a further embodiment, the first opening and the second opening are aligned coaxially and/or arranged on opposite positions of the cross-section of the feeding channel or the blowing lance, respectively. In other words, the openings share a common axis. This axis may run perpendicular to the feeding channel axis. Thus, a direct gas flow can be established between the openings, enabling a particular precise position detection. The openings may be arranged on opposing sides of the feeding channel with the channel diameter between them, thus making use of the complete cross-section.

In a further embodiment, the feeding channel has a straight portion positioned adjacent to the blowing lance and a bent portion positioned adjacent to the straight portion. The first opening and the second opening may be positioned close to a location in which the straight portion and the bent portion meet. Alternatively, the blowing lance is straight such that the optical cored wire can be fed along a straight path towards the vessel and the feeding channel has a bent portion positioned adjacent to the blowing lance. In this case, the first opening and the second opening may be positioned close to a location in which the blowing lance and the feeding channel meet.

The straight portion is directed towards the vessel and/or between the bent portion and the vessel. Thus, the optical cored wire can be introduced along a straight path into the melt and back from the melt without being bent. The mechanical properties of the optical cored wire change due to the heat which the optical cored wire is subjected to during temperature measurement and/or the subsequent cooling. In particular, its flexibility decreases. Moving the optical cored wire without bending avoids permanent deformation and, thus, wear, stress and friction of the optical cored wire, ingress of material from the vessel and blocking of the feeding system. Further movement of the optical cored wire is prevented.

The bent portion is positioned on the side of the straight portion facing away from the vessel. Thus, the space requirement of the device can be minimized.

The two openings are positioned close to the meeting location. In particular, an axial distance of any of the two openings to the meeting location with respect to the longitudinal direction of the feeding channel and/or the blowing lance is less than 25 cm, preferably less than 15 cm. In one configuration, said axial distance is below 5 cm or zero.

In one embodiment, the immersion device comprises a purge gas line for connecting a high-pressure gas source to the blowing lance in order to generate a first purge gas flow in the blowing lance towards the vessel and/or the melt contained therein. The high-pressure gas source provides a gas or gas mixture at a pressure of at least 5 bar, in particular at least 10 bar. The purge gas line is thus configured to withstand a pressure in the mentioned order. It is preferably designed as a tube and/or made of metal. The purge gas flow serves for keeping the hollow space within the blowing lance free of debris from the vessel and ensures reliable operation of the cored wire. This helps keeping the feeding channel free of slag and frozen metal from the vessel and, thus, ensures disturbance-free operation.

In a further embodiment, the purge gas line is connected to a flow divider for dividing a gas flow from the high-pressure gas source to two lines. A first line is connected to the blowing lance to generate the first purge gas flow and a second line is connected to the first opening. In other words, a single high-pressure gas source is used for both the purge gas flow and the position detection. Thus, an already present gas source can be used for detecting the position of the optical cored wire which minimizes the technical effort. The first line and/or the second line may be made of metal and/or designed as a tube. The first line and/or the second line may be very short and/or designed as a gas passage or opening for gas to pass through.

In a further embodiment, the immersion device comprises a detector line purging line which connects the purge gas line with the detector line in order to generate a second purge gas flow in the detector line through the second opening into the blowing lance or the feeding channel. In particular, a periodic and/or temporary gas flow is generated to purge the detector line. Thus, the detector line can be kept free of debris. In other words, the gas flow in the detector line can be reversed. A switching valve may be arranged within the detector line purging line such that the second purge gas flow can be selectively generated. The switching valve may be controlled by a control device of the immersion device. This embodiment enables a particular durable operation due to the included purging of the detector line.

In one embodiment, an end of the blowing lance which is directed or directable towards the vessel and/or the melt contained therein is realized as a de Laval nozzle. This enables the first purge gas flow to be introduced into the vessel at a high speed and/or supersonic speed. Thus, the slag floating on the melt below the optical cored wire can be displaced before and/or while introducing the optical cored wire. Thus, blocking of the feeding system is impeded and the temperature measurement is improved. In addition, the optical cored wire is cooled even inside the vessel such that its durability is increased and a particularly accurate temperature measurement is enabled.

In a further embodiment, the immersion device comprises an encoder configured to monitor the movement of the optical cored wire from a known starting point. In particular, the moving means includes a servo motor acting as encoder. The encoder may be configured to monitor the distance that the optical cored wire is moved from the known starting point. The starting point is in particular defined by a position of the leading end detected by the detecting means. Thus, after a position measurement, the encoder ensures that the position of the leading end is known during subsequent movement of the optical cored wire. Thus, a defined immersion depth of the optical cored wire into the melt can be ensured. The temperature measurement is further improved.

In one configuration, an encoder may be part of the moving means and/or a motor comprised by the moving means. The motor may be a servo motor and/or comprise a servo drive so as to monitor the motor position. In addition or as an alternative, an encoder may be arranged independently of the moving means. In case of a servo motor and an additional encoder, any displacement of the optical cored wire, e.g. due to blocking, which cannot be detected by the servo motor alone, can still be measured. This enables a particularly precise and disturbance-free position measurement.

In one embodiment, the immersion device comprises a control device for controlling movement of a leading end of the optical cored wire into the melt and/or out of the melt by the moving means. The control device may further be configured for controlling the detection of the presence of the optical cored wire by the detecting means. In particular, the control device is an electronic control device such as a microcontroller or a computer.

In a further embodiment, the immersion device is configured such that the detecting means can monitor the presence of the optical cored wire at a particular position during movement of the optical cored wire. The movement of the optical cored wire can be stopped after it has been detected that a leading end of the optical cored wire has passed the position. This can in particular be realized by the control device. Thus, the movement of the optical cored wire is restricted to the necessary amount. This increases measurement speed and enables a high process control.

A further aspect of the invention is an immersion device for measuring a temperature with an optical cored wire in an EAF vessel. The immersion device comprises a blowing lance connection device for mechanically connecting a blowing lance. The optical cored wire is movable in a feeding channel, in the blowing lance and/or in the blowing lance connection device relative to the entry point. The device further comprises a detecting means for detecting a position of the optical cored wire. The detecting means is configured to detect the presence of the optical cored wire in or close to the blowing lance connection device.

A further aspect of the invention is a method for detecting a position of an optical cored wire using an immersion device according to the invention. The method comprises moving, by a moving means, the optical cored wire in the feeding channel and/or in the blowing lance. The method further comprises detecting, by the detecting means, whether the optical cored wire is present at a position in or close to the blowing lance. All features, advantages and embodiments mentioned in relation to the device according to the invention also apply to the above aspect of the invention and to the method, and vice versa.

In particular, the detecting means comprises a part which is positioned at the position in or close to the blowing lance in order to detect the presence of the optical cored wire at said position. In particular, the method comprises measuring a temperature inside the vessel using the optical cored wire. Moving may comprise moving forward the optical cored wire prior to a measurement and/or moving backward the optical cored wire after a measurement. A plurality of measurements may be performed successively.

In one embodiment, the immersion device comprises a first opening and a second opening in the feeding channel or in the blowing lance. The detecting means may comprise a detector connected with the second opening. The step of detecting may comprise introducing pressurized gas into the first opening and/or detecting, by the detector, a property of a gas flow. In particular, the property is evaluated by an evaluation unit of the device which can be part of a control device.

After the detecting step, the method may comprise moving, by the moving means, the optical cored wire along a predetermined distance forward towards the melt in order to immerse the leading end into the melt in a predetermined depth. This movement may be monitored by an encoder and/or controlled by the control device. The position can be detected at the beginning and/or the end of a temperature measuring sequence. In particular, the position is detected before the first measuring sequence. Reliable position detection is possible with only one detecting means.

In a further embodiment, the step of moving includes retracting the optical cored wire away from the vessel and/or the melt at a first velocity, stopping the retracting movement and moving the optical cored wire forward towards the vessel and/or the melt at a second velocity which may be lower than the first velocity. The presence of the optical cored wire may be detected during the retracting movement and/or during the forward movement. The optical cored wire is in particular moved inside the feeding channel and/or the blowing lance.

In a two-step detection, a first detection may give an approximate position of the leading end. The first detection may be used to trigger stopping the fast retracting movement. Fast retracting is advantageous due to the adverse conditions close to the melt and to ensure quick measurement. The second detection may be performed during slower movement and therefore enable a very precise determination of the position.

BRIEF DESCRIPTION OF THE DRAWINGS

In the following, an exemplary implementation of the invention is explained in more detail using figures. Features of the exemplary implementation can be combined individually or in a plurality with the claimed objects, unless otherwise indicated. The claimed scopes of protection are not limited to the exemplary implementation.

The figures show.

DETAILED DESCRIPTION OF THE INVENTION

Figures 1, 2:
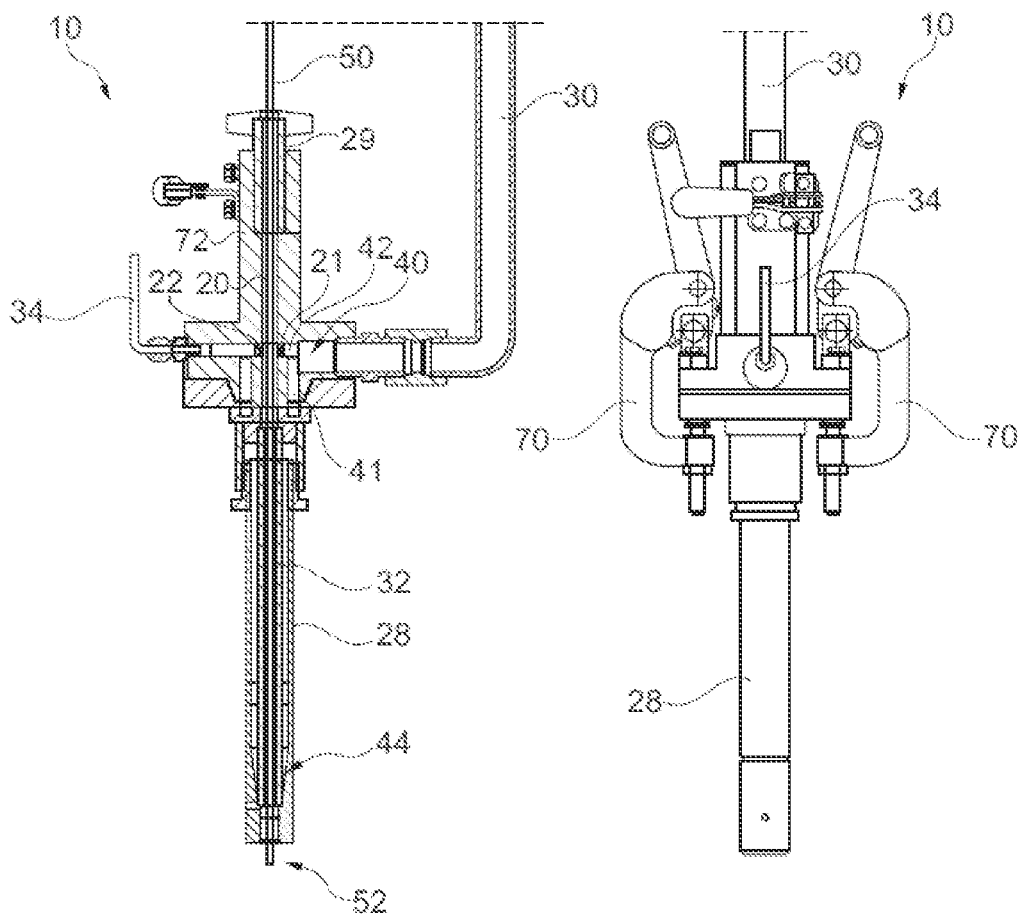
FIG. 1: a sectional side view of an immersion device.
FIG. 2: a front view of an immersion device.

FIG. 1 shows a sectional view of an immersion device 10 according to the invention for measuring a temperature of a metal melt in an EAF vessel by means of an optical cored wire 50. The optical cored wire 50 is aligned vertically in order to be fed into the melt through the feeding channel 20 and the blowing lance 28 in a downward direction using the moving means which are arranged at a certain distance in the upward direction but, however, not depicted here. Preferably, the moving means feeds the optical cored wire 50 from a coil arranged in the upward direction and rewinds unused fiber back to the coil.

Figure 4:
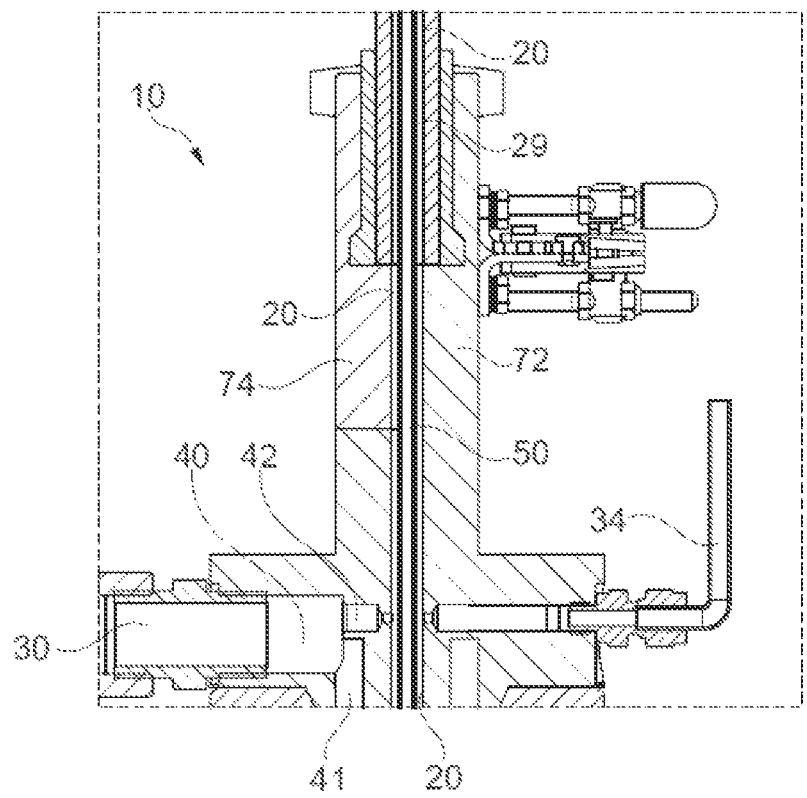
FIG. 4: a sectional side view of a detail of an immersion device.
Figure 6:
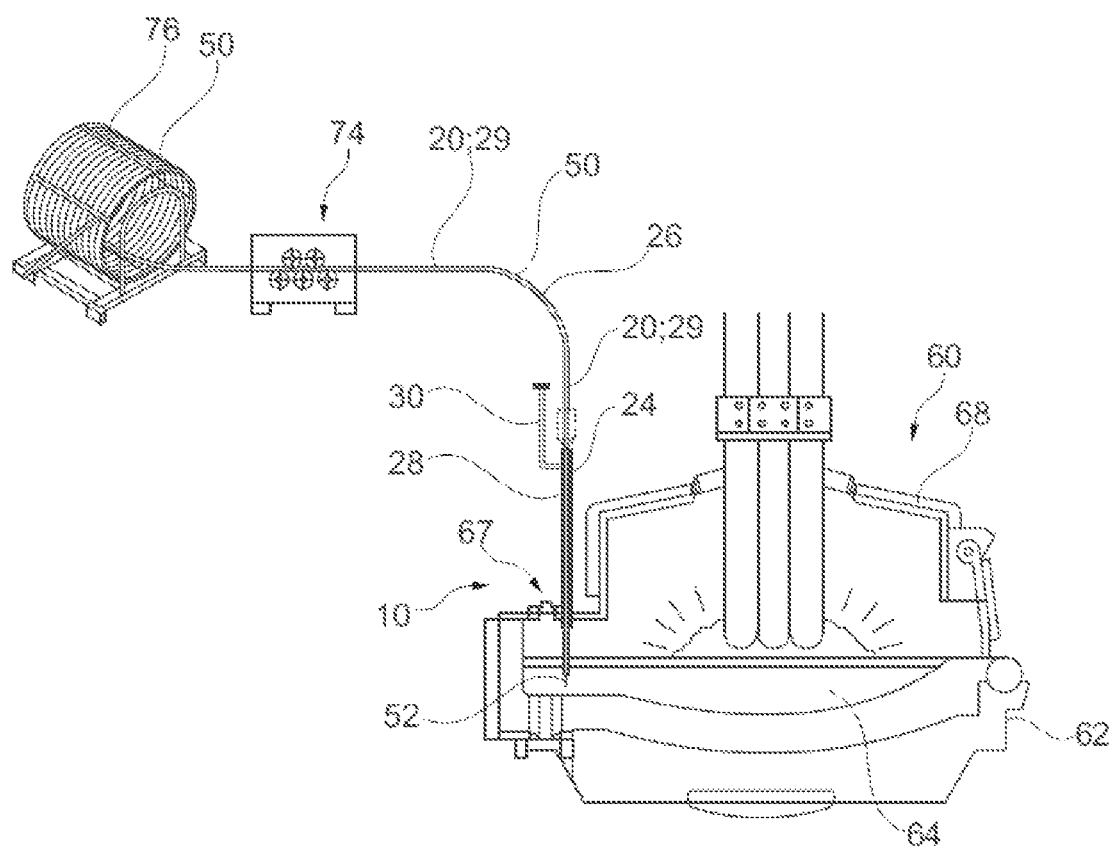
FIG. 6: a view of an electric arc furnace with the immersion device.

The immersion device 10 comprises a blowing lance 28 for blowing purge gas in a downward direction into an entry point of the vessel. Details are shown in FIG. 6. The blowing lance 28 is a metal tube with an internal space 32 in which the optical cored wire 50 can be moved, surrounded by purge gas. The forward end of the blowing lance 28 which is directed towards the melt is realized as de Laval nozzle 44. With respect to the longitudinal extension of the optical cored wire 50, the blowing lance 28 is positioned at an axially forward position adjacent to the feeding channel 20. In the embodiment shown here the feeding channel 20 comprises a feeding tube 29 made of metal and a vertically aligned guiding channel formed by a central body 72 of the immersion device 10. Said guiding channel is arranged axially adjacent to and coaxially with the blowing lance 28 and the feeding tube 29. It is arranged between the blowing lance 28 and the feeding tube 29, as depicted also in FIG. 4. In other embodiments, the blowing lance 28 can be positioned axially adjacent to the feeding tube 29.

The blowing lance 28 is attached to the central body 72 in a detachable manner. The feeding tube 29 is shown in a partially cutaway view in FIGS. 1 and 3 so that the optical cored wire 50 is visible. In particular, however, the feeding tube 29 continues further up to the moving means.

The immersion device 10 comprises a detecting means for detecting a position of the optical cored wire 50. The detecting means is configured for detecting the presence of the leading end 52 of the optical cored wire 50 close to the upper end of the blowing lance 28. The detecting means comprises a detector for measuring a property of a gas flow. Said detector is connected to the detector line but not shown here. The detecting means further comprises in the feeding channel 20 a first opening 21 and a second opening 22 which are arranged coaxially. In the shown embodiment, the openings 21 and 22 are arranged on opposite positions of the cross-section of the guiding channel formed by the central body 72 of the immersion device 10. The first opening 21 is connected to a gas supply means (not shown here) to realize a flow of pressurized gas through the first opening 21 into the feeding channel 20 and out of the feeding channel 20 through the second opening 22. When the leading end 52 of the optical cored wire 50 is moved forward or backward and passes the openings, the gas flow is influenced which can be detected by the detector. In one configuration, the detection is a pressure measurement. Pressure changes linked to the position of the leading end 52 are detected. While the leading end 52 is present between the blowing and receiving side (first opening 21 and second opening 22, respectively) a low pressure is observed. Once the gas path is free of obstructions a higher pressure is observed. Pressure measurement is particularly robust and durable.

The immersion device 10 comprises a purge gas line 32 for connecting a high-pressure gas source in order to establish a purge gas flow in the blowing lance 28 towards the melt contained inside the EAF vessel. In the embodiment shown here, the purge gas line 30 is connected to a flow divider 40 realized as a chamber with at least two outlet openings. At least one outlet opening is connected to a first line 41 extending circumferentially around the guiding channel of the central body 72. Said first line 41 is configured to lead the introduced gas into the space 32 of the blowing lance 28 in order to establish the purge gas flow. At least one further outlet opening is connected to a second line 42 extending radially which is connected to the first opening 21 to generate the gas flow for the position detection.

Figure 3:
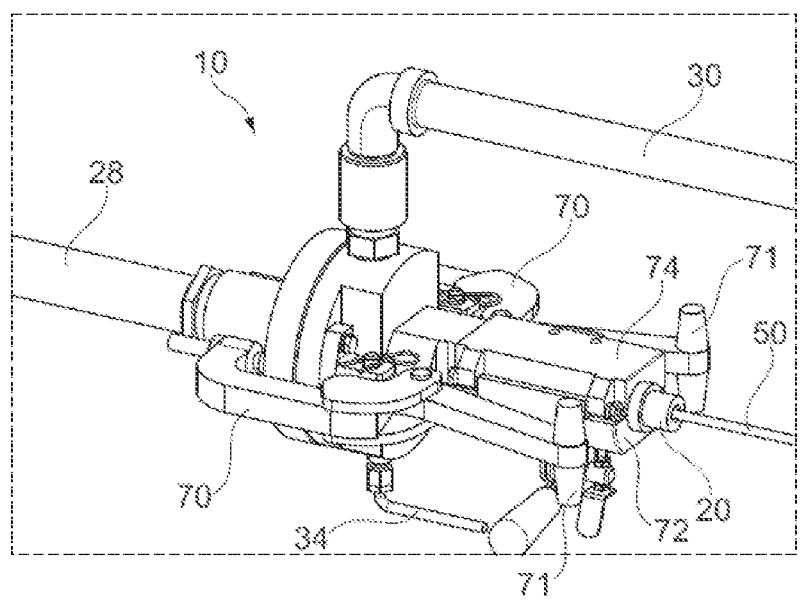
FIG. 3: a perspective view of an immersion device.

FIG. 2 shows a device 10, in particular the device 10 of FIG. 1, in front view. FIG. 3 shows a device 10, in particular the device of FIG. 1 and/or FIG. 2, in a perspective view. It is visible that the device 10 comprises two clamping devices 70 which allow for a quick and easy replacement of the blowing lance 28 without any tools. The clamping devices 70 each comprise clamping means which exert a compressive force onto a flange of the of the blowing lance 28 and a flange of the central body 72, pressing them together in the axial direction, when the clamping devices 70 are in the closed position. The clamping devices 70 each comprise a handle 71 which can be pivoted to open the clamping devices 70 to replace the blowing lance 28 and to close the clamping devices 70 to attach the blowing lance 28 without any tool.

Figure 5:
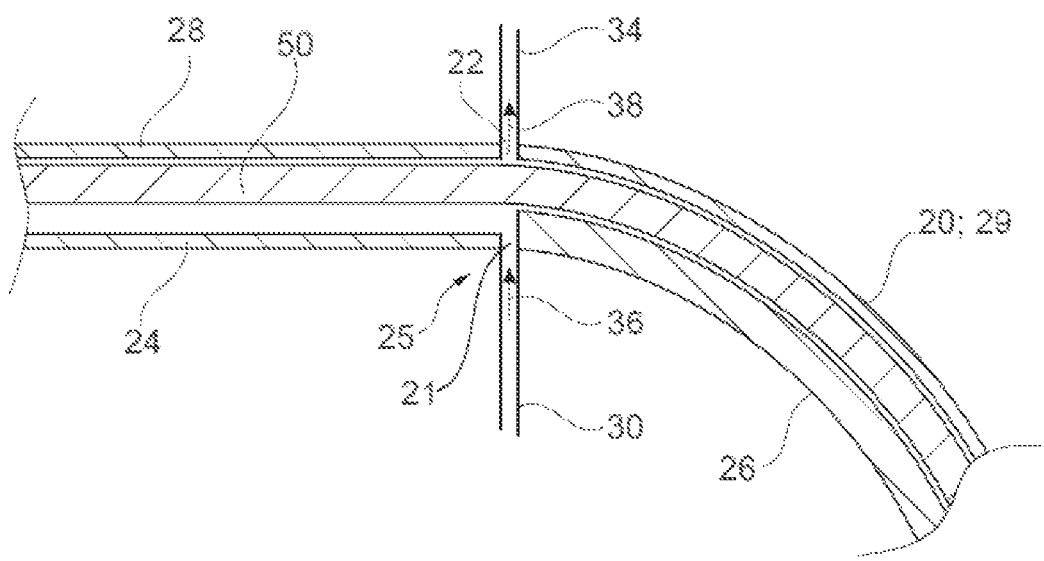
FIG. 5: a schematic section of another detail of an immersion device.

FIG. 5 schematically shows a detail of another configuration of the immersion device in which the feeding channel 20 is realized as feeding tube 29 and positioned adjacent to the blowing lance 28. The blowing lance 28 is straight for feeding the optical cored wire 50 on a straight path towards the melt. The feeding channel 29 has a bent portion 26 in order to save space. Location 25 is positioned between the straight portion 24 represented by the blowing lance 28 and the bent portion 26. The axial position of the first opening 21 and the second opening 22 and, thus, of the inlet of the purge gas line 30 and the connection of the detector line 34, is on or close to the location 25. Pressurized gas is divided into a purge gas flow inside the blowing lance 28 and a gas flow 38 to be measured. The gas forming the gas flow 38 of which the pressure or the flow is to be measured enters through the first opening 21. The positions of the openings 21, 22 may also be swapped. The openings 21, 22 are aligned coaxially and arranged on opposite positions of the cross-section of the feeding channel 20 and the blowing lance 28.

FIG. 6 shows an electric arc furnace (EAF) 60 with an immersion device 10. The EAF 60 comprises a vessel 62 containing the metal melt 64, a movable lid 68 and a platform 67 arranged on the side of the vessel 62. The entry point into the vessel 62 through which the optical cored wire 50 enters the vessel 62 is arranged on the platform 67. The immersion device 10 is also arranged on the platform 67. FIG. 6 shows the relative positions of the immersion device and the EAF in a merely schematic manner. However, the immersion device is typically configured to be fixed on the platform 67, such that the feeding tube 29, the blowing lance 28 and the leading end 52 remain stationary when the vessel 62 is tilted during operation.

The optical cored wire 50 is arranged on a coil 76. It is moved, i.e. uncoiled from the coil 76 and wound back onto the coil 76, by a moving means 74. The moving means 74 comprises rollers for moving the optical cored wire 50 and may include a servo motor to drive at least one of the rollers. Between the moving means 74 and the blowing lance 28, the optical cored wire 50 is guided inside the feeding channel 20. The feeding channel 20 has a bent portion 26 and straight portion 24 directed towards the vessel 62. The feeding channel comprises a feeding tube 29 and a guiding channel formed by the central body of the immersion device 10. For the sake of clarity, the detecting means is not shown here.

LIST OF REFERENCE SIGNS

Immersion device 10
Feeding channel 20
First opening 21
Second opening 22
Straight portion 24
Location 25
Bent portion 26
Blowing lance 28
Feeding tube 29
Purge gas line 30
Space 32
Detector line 34
Gas flow 38
Flow divider 40
First line 41
Second line 42
De Laval nozzle 44
Optical cored wire 50
Leading end 52
Electric arc furnace 60
Vessel 62
Melt 64
Platform 67
Lid 68
Clamping device 70
Handle 71
Central body 72
Moving means 74
Coil 76

What is claimed is:

1. An immersion device for measuring a temperature of a metal melt inside an electric arc furnace vessel with an optical cored wire, the immersion device comprising a blowing lance for blowing purge gas into an entry point to the vessel and a detecting means for detecting a position of the optical cored wire, wherein the optical cored wire can be moved in a feeding channel and/or in the blowing lance relative to the entry point, characterized in that the detecting means is configured to detect the presence of the optical cored wire in or close to the blowing lance.

2. The immersion device according to claim 1, wherein the detecting means comprises a detector for measuring a property of a gas flow, wherein the detector is in particular configured for measuring a flow rate of the gas flow, a flow velocity of the gas flow and/or a gas pressure in the gas flow.

3. The immersion device according to claim 2, wherein the feeding channel or the blowing lance has a first opening and a second opening, wherein a gas supply means can be connected with the first opening for introducing pressurized gas into the first opening and wherein the detector is connected with the second opening by means of a detector line.

4. The immersion device according to claim 3, wherein the first opening and the second opening are aligned coaxially,
wherein the first opening and the second opening are in particular arranged on opposite positions of the cross-section of the feeding channel or the blowing lance, respectively.

5. The immersion device according to claim 3, wherein, the feeding channel has a straight portion positioned adjacent to the blowing lance and a bent portion positioned adjacent to the straight portion, wherein the first opening and the second opening are positioned close to a location in which the straight portion and the bent portion meet, or
the blowing lance is straight for feeding the optical cored wire along a straight path towards the melt and the feeding channel has a bent portion positioned adjacent to the blowing lance, wherein the first opening and the second opening are positioned close to a location in which the blowing lance and the feeding channel meet.

6. The immersion device according to claim 1, wherein the detecting means comprises an inductive sensor for detecting the presence of the optical cored wire.

7. The immersion device according to claim 1, wherein the immersion device comprises a moving means for moving the optical cored wire in the feeding channel and/or in the blowing lance relative to the entry point.

8. The immersion device according to claim 4, wherein the moving means is configured for feeding the optical cored wire from a coil and for winding unused fiber on the coil.

9. The immersion device according to claim 7, wherein the immersion device comprises a control device for controlling movement of a leading end of the optical cored wire into the melt and/or out of the melt by the moving means.

10. The immersion device according to claim 9, wherein the immersion device is configured such that the detecting means can monitor the presence of the optical cored wire at a particular position during movement of the optical cored wire, and the movement of the optical cored wire can be stopped after it has been detected that a leading end of the optical cored wire has passed the position.

11. The immersion device according to claim 1, wherein the immersion device comprises a purge gas line for connecting a high-pressure gas source to the blowing lance in order to generate a first purge gas flow in the blowing lance towards the melt.

12. The immersion device according to claim 11, wherein an end of the blowing lance which is directed towards the melt is realized as a de Laval nozzle.

13. A method for detecting a position of an optical cored wire using an immersion device according to claim 1, the method comprising:
moving, by a moving means, the optical cored wire in the feeding channel and/or in the blowing lance,
detecting, by the detecting means, whether the optical cored wire is present at a position in or close to the blowing lance.

14. The method according to claim 13, wherein the immersion device comprises a first opening and a second opening in the feeding channel or the blowing lance and the detecting means comprises a detector connected with the second opening, the step of detecting comprising:
introducing pressurized gas into the first opening, and
detecting, by the detector, a property of a gas flow.

15. The method according to claim 13, wherein the step of moving includes retracting the optical cored wire away from the melt at a first velocity, stopping the retracting movement and moving the optical cored wire forward towards the melt at a second velocity which is lower than the first velocity, wherein the presence of the optical cored wire is detected during the retracting movement and during the forward movement.

* * * * *